UNITED STATES PATENT OFFICE.

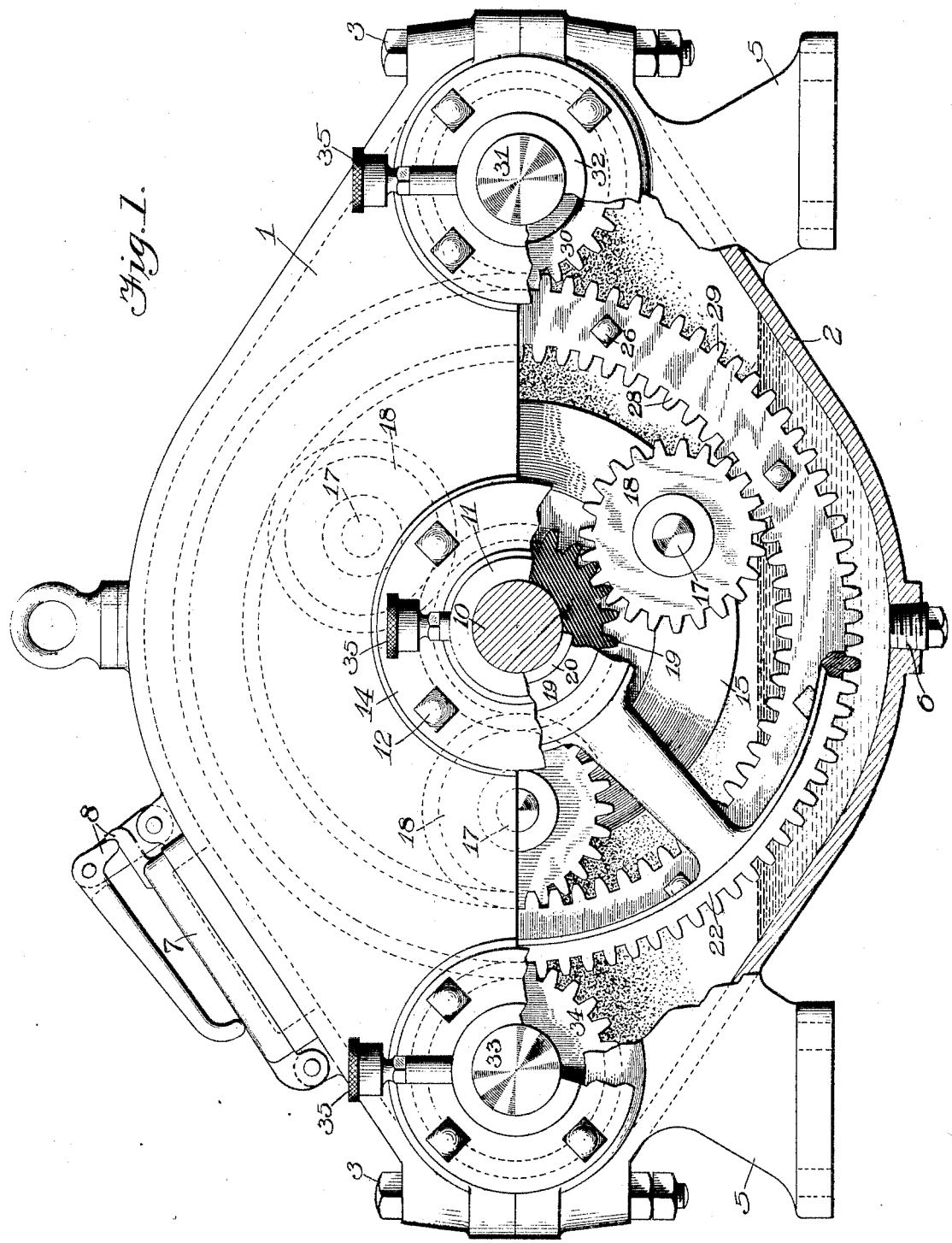

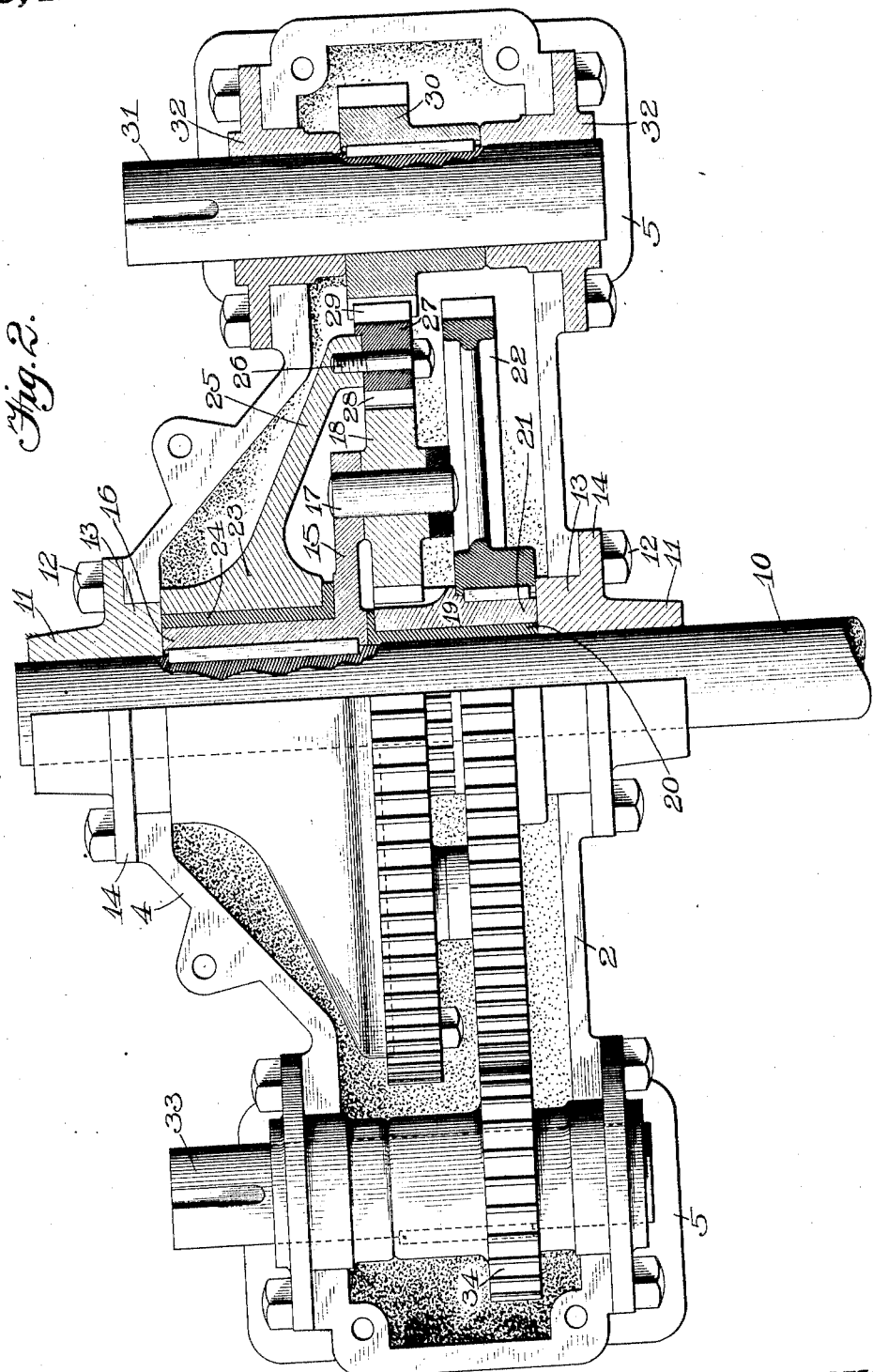

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

DIFFERENTIAL GEAR.

1,108,422.  Specification of Letters Patent.  Patented Aug. 25, 1914.

Application filed May 13, 1909. Serial No. 495,739.

*To all whom it may concern:*

Be it known that I, THOMAS E. BARNUM, a citizen of the United States, residing at Milwaukee, in the county of Milwaukee and State of Wisconsin, have invented new and useful Improvements in Differential Gears, of which the following is a full, clear, concise, and exact description, reference being had to the accompanying drawing, forming a part of this specification.

My invention relates to improvements in differential gears.

It is the object of my invention to provide a differential gear particularly adapted to operate gun turrets and other like heavy masses. It should be understood, however, that my invention is not limited to any particular application as it may be used for various different purposes and in various different relations.

A further object of my invention is to provide an efficient and durable structure which may be conveniently installed where the space available is more or less limited.

Other objects and advantages of my invention will be hereinafter set forth.

In order to more clearly disclose the nature of my invention, I shall describe the device illustrated in the accompanying drawing which embodies my invention in its preferred form.

Of course, my invention is capable of various modifications.

In the accompanying drawing, Figure 1 is a side elevation of the device with a portion of the inclosing casing and portions of the interior mechanism broken away. Fig. 2 is a top plan view of the device with a portion of the casing removed and showing parts of the interior mechanism in section.

The mechanism is preferably inclosed in a casing which I prefer to form in two sections 1 and 2. Of course, the casing may be formed in any preferred manner. It is my object to form the casing of just sufficient size to accommodate the mechanism, and further to so construct the casing that a portion, or portions, thereof may be removed to give free access to all parts of the mechanism. As will be hereinafter set forth, the casing supports all of the mechanism, and it is, therefore, necessary that the same should be strong and rigid. The casing illustrated is one which I have worked out in practice, the sections 1 and 2 each forming practically one half thereof. The two sections are constructed to fit together to form a complete housing for the mechanism, which will be both dust proof and oil tight. The two sections may be secured together by any suitable means, such as bolts 3. It will be noted that on one side of the casing is formed a substantially conical shaped chamber 4, and that this structure adds greatly to the strength and rigidity of the casing as a whole. The lower section 2 of the casing is preferably provided with supporting members 5, arranged at opposite ends thereof. As will be hereinafter set forth, the casing is arranged to contain oil, and I, therefore, provide a removable plug 6 in the section 2 to afford means for draining purposes. The upper section 1 of the casing is provided with an opening adapted to be closed by a hinged door 7, which is arranged to be locked in closed position by a suitable clamping mechanism 8.

Extending through the opposite sides of the casing at substantially the center thereof is a shaft 10, which, as will be hereinafter set forth, is the driven shaft. The shaft 10 is revolubly mounted in suitable bearings 11 which are preferably detachably secured to the casing by bolts or screws 12. The bearings 11 are preferably provided with annular portions 13, which snugly fit into apertures in the casing, and annular flanges 14 which engage the outside of the casing, thus making dust proof and oil tight joints. Keyed or otherwise rigidly secured to the shaft 10 is a member 15 having an elongated cylindrical hub 16. The member 15 carries a plurality of laterally extending studs 17 spaced equidistantly from one another. In the drawing, I have shown three of such studs, upon each of which is revolubly mounted a small pinion 18. The pinions 18 are all arranged to mesh with another pinion or gear wheel 19 revolubly mounted on the shaft 10. The pinion 19 is preferably arranged to revolve on a bushing 20 which is interposed between it and the shaft 10. The pinion 19 is also preferably provided with an elongated cylindrical hub 21 upon which is keyed, or otherwise rigidly secured, a large gear wheel 22.

Revolubly mounted on the hub 16 of the member 15 is a spider 23. In practice, I prefer to interpose a suitable bushing 24 between the hub of the spider and the hub 16. Suitably secured to the web 25 of the spider 23, as by means of bolts or screws 26, is a ring 27. The ring 27 surrounds the pinions 18, and on its inner surface is provided with gear teeth 28 with which the pinions 18 are arranged to mesh. On its outer periphery the ring is provided with gear teeth 29. In practice, I prefer to form a ring of substantially the same size as the gear wheel 22, and preferably provide the same on its outer periphery with the same number of gear teeth as the gear wheel 22. Of course, the speed ratios of the gears may be varied as desired. For operating the ring 27, I provide at one end of the casing a driving pinion 30, adapted to mesh with the gear teeth 29 thereon. The pinion 30 is keyed, or otherwise rigidly secured, to a shaft 31 revolubly mounted in bearings 32. The bearings 32 are substantially like the bearings for the shaft 10 and are secured to the casing in a similar manner. Keyed, or otherwise rigidly secured, to a shaft 33, revolubly mounted in the opposite end of the casing is another driving pinion 34, adapted to mesh with and drive the gear wheel 22. The shaft 33 is mounted in bearings like the shaft 31. The shafts 31 and 33 are adapted to be coupled or otherwise connected to suitable operating devices. In practice, I prefer to so construct the pinions 30 and 34 that they may be interchanged on the driving shafts or else placed on the same driving shafts in a manner to cause the shaft 31 to drive gear wheel 22, and shaft 33 to drive the ring 27. This enables me to use either of the driving shafts for the high speed driving member. Electric motors are commonly used for this purpose, but, of course, the particular form of operating devices is immaterial to my present invention.

The shafts 31 and 33, when rotated, impart movement to the gear wheel 22 and to the ring 27. Operation of the gear wheel 22 causes the operation of the pinion 19, which is loosely mounted on the driven shaft. The ring 27 and the pinion 19 thus coöperate with the pinions 18 carried by the member 15 in a well known manner to operate the driven shaft 10. The speed of the driven shaft 10 depends upon the relative speed imparted to the ring 27 and the pinion 19. For instance, in the particular mechanism illustrated, when the shafts 31 and 33 are revolved in opposite directions at a speed ratio of 1 to 3, thereby causing the pinion 19 to be driven at a speed three times as great as the ring 27, no movement is imparted to the driven shaft. Any variation from this speed ratio, however, will upset the equilibrium of the differential, thereby causing the shaft 10 to be operated. The greater the departure from the speed ratio of 1 to 3, the greater becomes the speed of the driven shaft 10. It is also understood that direction of operation of the driven shaft 10 may be reversed by merely varying the relative speeds of the driven members without reversing the direction of operation thereof.

For properly lubricating the bearings of the several shafts, I preferably provide the same with lubricating devices 35 of any preferred type. In practice, I also prefer to provide an oil bath for the several gears.

Having thus described my invention, what I claim as new and desire to secure by Letters Patent, is:—

1. In a differential gear, in combination, a driven shaft, a pair of driving shafts, a gear wheel loosely mounted on the driven shaft, a member rigidly secured to the driven shaft, a plurality of pinions carried by said member and arranged to mesh with said gear wheel, a spider loosely mounted on the driven shaft, a ring supported by the arms of said spider, said ring being arranged to surround said pinions and having on its inner face a series of gear teeth arranged to mesh with said pinions, and connections for causing one of said driving shafts to rotate said ring and the other of said driving shafts to rotate said gear wheel.

2. In a differential gear, in combination, a driven shaft, a pair of driving shafts, a gear wheel loosely mounted on the driven shaft, a member rigidly secured to the driven shaft, a plurality of pinions carried by said member and arranged to mesh with said gear wheel, a spider loosely mounted on the driven shaft, a ring supported by the arms of said spider, said ring being arranged to surround said pinions and having on its inner face a series of gear teeth arranged to mesh with said pinions, connections for causing one of said driving shafts to rotate said ring and the other of said driving shafts to rotate said gear wheel, and a casing inclosing said shafts and said gearing, said shafts having portions projecting through said casing.

3. In a differential gear, in combination, a driven shaft, a pair of driving shafts, a gear wheel loosely mounted on the driven shaft, a member rigidly secured to the driven shaft, a plurality of pinions carried by said member and arranged to mesh with said gear wheel, a spider loosely mounted on the driven shaft, a ring supported by the arms of said spider, said ring being arranged to surround said pinions and having on its inner face a series of gear teeth arranged to mesh with said pinions, connections for causing one of said driving shafts to rotate said ring and the other of said driving shafts to rotate said gear wheel, and a casing inclosing said shafts and said gearing, said casing having bearings for revolubly supporting said shafts.

4. In a differential gear, in combination, a driven shaft, a pair of driving shafts, a gear wheel loosely mounted on the driven shaft, a member rigidly secured to the driven shaft, a plurality of pinions carried by said member and arranged to mesh with said gear wheel, a spider loosely mounted on the driven shaft, a ring supported by the arms of said spider, said ring being arranged to surround said pinions and having on its inner face a series of gear teeth arranged to mesh with said pinions, connections for causing one of said driving shafts to rotate said ring and the other of said driving shafts to rotate said gear wheel, and a casing inclosing said shafts and said gearing, said casing being formed in two sections, one of said sections having bearing portions for revolubly supporting all of said shafts, and the other section being detachable without disturbing any of the mechanism.

5. In a differential gear, in combination, a driven shaft, a pair of driving shafts, a pinion loosely mounted on the driven shaft, said pinion having an elongated hub, a gear wheel rigidly mounted on the hub of said pinion, a member rigidly mounted on the driven shaft, a plurality of pinions carried by said member and arranged to mesh with said first mentioned pinion, said member having an elongated hub, a spider having a hub loosely fitting on the hub of said member, said spider having radial arms, a ring secured to the arms of said spider, said ring being arranged to surround the pinions carried by said member and having on its inner face a series of gear teeth arranged to mesh therewith, a pinion rigidly mounted on each of said driving shafts, one of said last mentioned pinions being arranged to mesh with said gear wheel to drive said first mentioned pinion, and the other of said last mentioned pinions being arranged to mesh with a series of gear teeth on the outer periphery of said ring to drive said ring and said spider.

6. In a differential gear, in combination, a driven shaft, a pair of driving shafts, a pinion loosely mounted on the driven shaft, said pinion having an elongated hub, a gear wheel rigidly mounted on the hub of said pinion, a member rigidly mounted on the driven shaft, a plurality of pinions carried by said member and arranged to mesh with said first mentioned pinion, said member having an elongated hub, a spider having a hub loosely fitting on the hub of said member, said spider having radial arms, a ring secured to the arms of said spider, said ring being arranged to surround the pinions carried by said member and having on its inner face a series of gear teeth arranged to mesh therewith, a pinion rigidly mounted on each of said driving shafts, one of said last mentioned pinions being arranged to mesh with said gear wheel to drive said first mentioned pinion, and the other of said last mentioned pinions being arranged to mesh with a series of gear teeth on the outer periphery of said ring to drive said ring and said spider, and a casing for inclosing all of said gearing, said casing being formed in two longitudinal sections, one of said sections being arranged to support all of said shafts and said gearing, and the other of said sections being detachably secured to said first mentioned section.

7. In a differential gear, in combination, a driven shaft, a pair of driving shafts, a gear wheel loosely mounted on the driven shaft, a member rigidly secured to the driven shaft, a plurality of pinions carried by said member and arranged to mesh with said gear wheel, a spider loosely mounted on the driven shaft, a ring supported by the arms of said spider, said ring being arranged to surround said pinions and having on its inner face a series of gear teeth arranged to mesh with said pinions, and connections for causing either of said driving shafts to rotate said ring and the other of said driving shafts to drive said gear wheel.

8. In a differential gear, in combination, a driven shaft, a pair of driving shafts, a gear wheel loosely mounted on the driven shaft, a member rigidly secured to the driven shaft, a plurality of pinions carried by said member and arranged to mesh with said gear wheel, a spider loosely mounted on the driven shaft, a ring supported by the arms of said spider, said ring being arranged to surround said pinions and having on its inner face a series of gear teeth arranged to mesh with said pinions, said ring being also provided on its outer periphery with a series of gear teeth, and pinions arranged on said driving shafts, one of said last mentioned pinions being arranged to mesh with said gear wheel, and the other being arranged to mesh with the teeth on the outer periphery of said ring, said last mentioned pinions being adapted to be arranged to cause either of said driving shafts to operate said ring and the other to operate said gear wheel.

In witness whereof, I have hereunto subscribed my name in the presence of two witnesses.

THOMAS E. BARNUM.

Witnesses:
 FRANK H. HUBBARD,
 SHEPLER W. FITZ GERALD.